United States Patent [19]

Anders

[11] Patent Number: 5,217,209

[45] Date of Patent: Jun. 8, 1993

[54] TRAILER HYDRAULIC LIFT

[76] Inventor: Richard E. Anders, 1633 S. Pleasant, Independence, Mo. 64055

[21] Appl. No.: 843,417

[22] Filed: Feb. 27, 1992

[51] Int. Cl.⁵ .............................................. B60S 9/04
[52] U.S. Cl. ...................................... 254/419; 254/423
[58] Field of Search ............... 254/418, 419, 420, 423, 254/424, 45; 280/427, 475

[56] References Cited

U.S. PATENT DOCUMENTS

| | | | |
|---|---|---|---|
| 2,442,881 | 6/1948 | Soskin | 254/423 |
| 2,546,203 | 3/1951 | Tucker | 254/423 |
| 2,942,676 | 6/1960 | Kraus | 254/423 |
| 3,169,012 | 2/1965 | Fagan | 254/419 |
| 3,255,995 | 6/1966 | Bartlett | 254/419 |
| 3,874,696 | 4/1975 | Gardner et al. | 254/419 |

FOREIGN PATENT DOCUMENTS 729257 7/1932 France .................. 254/423

*Primary Examiner*—Robert C. Watson
*Attorney, Agent, or Firm*—Thomas M. Scofield

[57] ABSTRACT

Improvements in the static trailer support system for a trailer normally pulled by a truck or cab/trailer assembly; retractable support legs for the front end of a trailer section of a truck/trailer or cab/trailer assembly enabling the ready separation of the truck or cab from the trailer assembly and, thereafter, the indefinite support of the trailer assembly in the stopped position; hydraulic cylinders and inter connections thereof that operate to provide an entirely new, horizontally retractable support system for the front end of the trailer, as well as an entirely downwardly extendable support system when the trailer and its drag are in stopped position; a construction and process or procedure for using same which either extends an entirely retractable pair of hydraulic cylinder support legs to carry the weight of the front end of the trailer when the latter is in stopped position or, once the front end of the trailer is coupled with a drag truck or drag cab, substantially entirely retracts the entire support system against the underside of the trailer.

6 Claims, 1 Drawing Sheet

U.S. Patent        June 8, 1993        5,217,209
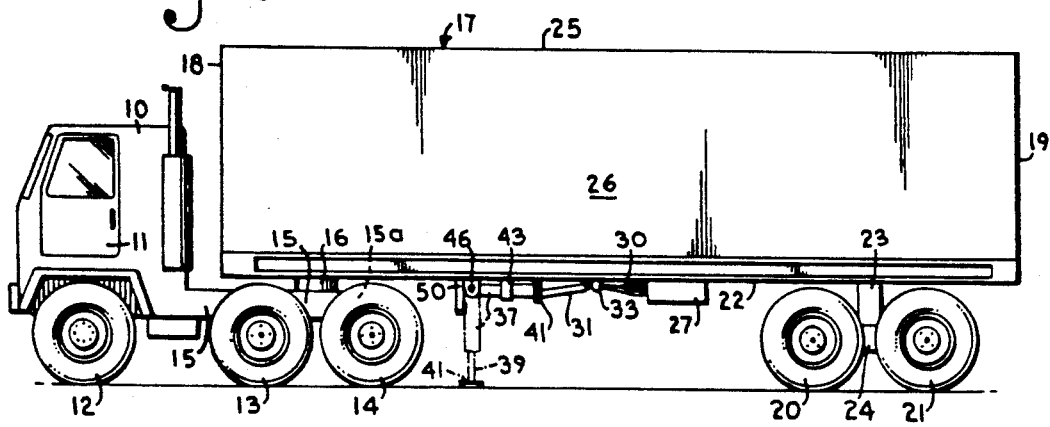
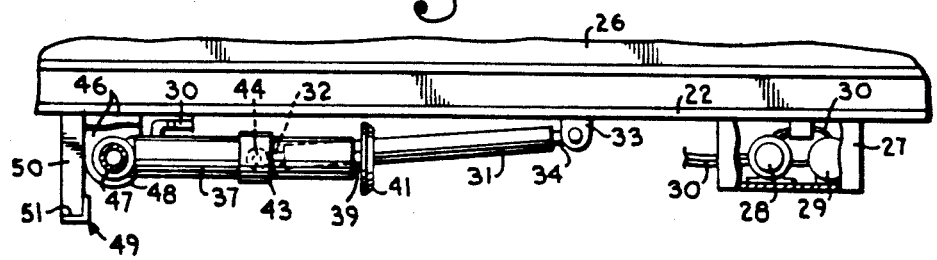
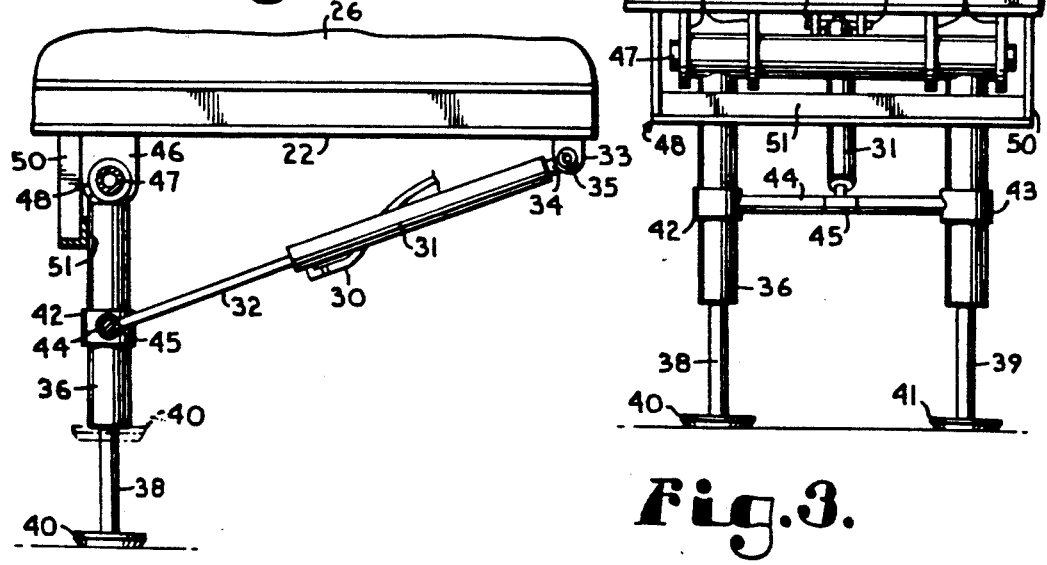

TRAILER HYDRAULIC LIFT

BACKGROUND OF THE INVENTION

This invention relates to an improvement in the trailer section of a truck/trailer or cab/trailer assembly.

Previously, support wheels and legs have been provided for cab drawn trailers ahead of the center of gravity of the stopped or static said trailer. Further, some sets of hydraulically extendable vertical legs have been provided at more than one position along the length of the trailer for various purposes. However, there is one basic arrangement common to essentially all trailers lying in the fact that, once the prime mover, trailer or cab has been disengaged from the trailer, the trailer must stand, level and secure, at its release point or position for loading or unloading. An example of a vehicle which would be integral with respect to the cab and the trailer (the two not detachable) yet use one or more pairs of stabilizing or position holding hydraulic jacks would be a crane, where a multiplicity of opposed hydraulic jacks are provided in order to be able to lift the crane assembly off the wheels and onto the hydraulic jack pattern.

In the subject development, a substitution of three substantially fully retractable hydraulic cylinders is provided along the length of the trailer forward of the front center of gravity thereof, whereby to be able to effect substantially completely protected travel of the cylinders, with their receiving, supporting and connecting means, yet thereafter be able to supply fully effective and immediately actuatable support means when the vehicle is stopped and it is desired to disengage the cab assembly from the trailer assembly.

Thus, the subject apparatus has, as a primary use, to lift and support the front end of the static trailer and allow the tractor to pull away from it leaving the trailer to stand on its own.

In a specific example, my invention is comprised of a twelve (12) volt hydraulic pump, such run by connecting it to the already available electric plug of the truck that is normally connected to the tractor. The latter line will be the source of electricity needed for the pump. There are provided five (5) 24 inch long by ½ inch diameter hoses and one 15 inch by ½ inch diameter hose, all of them leading to and from the hydraulic cylinders and carrying hydraulic fluid to the two sometimes vertical hydraulic cylinders and the translating cylinders. Such cylinders are the dollies that will raise or lower as desired and hold the trailor in place. These cylinders typically will support 35,000 pounds per cylinder. These remarks are illustrative only, not limiting.

When these cylinders are attached to a large semi-trailer, they will swing up flush against the bottom of the trailer and be held there by a third hydraulic cylinder, when the tractor is engaged with the trailer, thus being effectively out of the way when not in use. It follows that they are not likely to drag on a bump or hill and become bent or dented. The latter often happens with the dollies being used now. Still further, by being drawn up next to the bottom of the trailer, these new dollies will have protection from snow and ice; so as to save the truck driver the problem of freeing them from such snow and ice before he can support the trailer in order to remove the tractor from it. The 12 volt hydraulic pump is turned on or off with a flick of a switch, thus saving the driver a job of one hour or more of hand cranking to get the sleeve extentions down to hold the trailer.

PRIOR ART

The inventor is aware of the following patents which relate, to greater or lesser extent, to the subject invention:

Austrian patent 89,214, apparently issued August, 1922;

German patent 973,819, issued June 1960;

Van Der Ende, 3,433,457 "Hoist Device For Dump Trucks", issued Mar. 18, 1969;

Keller, Jr., et al, 3,702,181 "Hydraulic Outrigger Jack With Screw Lock", issued Nov. 7, 1972;

Garry, 4,027,737, "Jacking Means For Providing Additional Clearance . . . ", issued Jun. 7, 1977;

Hanser, 4,061,309, issued Dec. 6, 1977 for "Vehicle Leveling System and Device therefore;

Mena, 4,150,813, "Jack System For Vehicle", issued Apr. 24, 1979;

Tekkosho K. K. et al, 52-49521 issued Oct. 15, 1975, "Method Of Shifting a Mobile Crane";

Hisamatsu, "Vehicle With Jack", issued Oct. 26, 1983, number 58-183338(A);

OBJECTS OF THE INVENTION

A first object of the invention is to provide a new hydraulic jack support and suspension system for truck-trailer assemblies whereby such system readily allows the tractor to disengage from the front of the trailer and thereafter enable the trailer to stand solidly on its own supports with much more convenience in use and saving of expense in installation, use, repair and the like.

Another object of the invention is to provide such hydraulic trailer lift and dolly systems, wherein the primary hydraulic cylinders of the system, when not in use supporting the trailer in a static position, will pivot or swing up entirely or almost entirely against the bottom of the trailer and be held there, so long as the tractor is engaged, thus to be completely out of the way when not in use.

Another object is to end the need for replacing dolly collars of conventional sort which extend downwardly at least half the distance from the front trailer floor. Such may be bent, dented or torn off by contact with a surface object such as a railroad truck.

Another object of the subject invention is to provide such a hydraulic trailer lift and dolly which, when retracted as described, will not drag or make contact on a bump or hill and become bent, dented or even inoperative from collision.

Another object of the invention is to provide a new retractable trailer construction wherein the subject dollies or lifts, by being held next to the bottom surface of the trailer as the trailer is drawn by the tractor, have unusually effective protection from snow and ice, thus saving the truck driver problems of freeing such hydraulic cylinders and apparatus relating and connected thereto for such front support to the trailer to be put down promptly and expeditiously, thus to be able to pull the tractor from it.

Yet another object of the invention is to provide new apparatus and procedure with respect to road trailers drawn by road tractors where there is absolutely no need for or to provide or several permanently downwardly extending sleeves or sockets which receive therewithin piston lengths for extrusion thereof downwardly when the tractor is to be supported. Thus, such vulnerable, permanent, downwardly extending sleeve structures are totally removed by my invention.

Another object of the invention is to provide a system of the type described wherein no extra bearing is required.

Still another object of the invention is to provide a pair of linked hydraulic cylinders for the front end of truck trailers which linked cylinders are normally horizontal when out of use and normally vertical when in use, the said two hydraulic cylinders being driven to a vertical position or raised to a horizontal position by a third hydraulic cylinder also linked to the underside of the trailer vehicle; there also being provided extremely simple and absolutely dependable means which limits and prevents the paired hydraulic cylinders from going over vertical as they are moved from horizontal to vertical position and take up support of the front of the trailer.

THE DRAWINGS

In the drawings, which a form a part of the instant specification and are to be read in conjunction therewith, an embodiment of the invention is shown and, in the various views, like numerals are employed to indicate like parts.

FIG. 1 is a side view of a conventional truck cab with a trailer coupled thereto, the subject hydraulic support system and assembly being shown in full lines up at the top of the arc through which it swings, in storage as it were, for travel of the truck cab with the trailer; in dotted lines is shown one of the hydraulic piston support legs, vertically set, whereby to support the trailer when it is to be disconnected from the cab assembly or is actually disconnected therefrom.

FIG. 2 is essentially an enlarged view of the center full line showing of FIG. 1 with respect to the hydraulic support system, this view illustrating the assembly in up or storage position.

FIG. 3 is a front view of the assembly of FIG. 2, but with the legs down (hydraulic cylinders and pistons thereof down) the pistons thereof extended into contact with the ground.

FIG. 4 is a view like the center and left hand side of FIG. 2, but with the single, central hydraulic cylinder at the right having driven the legs down to the position of FIG. 3 and, thereafter, the leg pistons fully extended to support position as in FIG. 3.

STRUCTURE AND FUNCTION

The subject improvement operates in the environment of a truck, tractor or cab/trailer. Accordingly, looking at FIG. 1, the numeral 10 designates a conventional tractor or cab construction adapted to link with and pull or carry and move a cab trailer of conventional sort. This cab has door 11 a front set of wheels 12 and two sets rear wheels 13 and 14. The rear portion of cab 10 comprises horizontal platform 15 which carries thereon conventional means 16 for removably and essentially pivotally connecting the cab to the trailer generally designated 17. The truck cab is only schematically shown as it does not comprise any part of the invention, but rather can be embodied by any of the many, many types, makes and forms of tractor pulling devices for trailers of the sort illustrated.

It is well known that truck trailers 17 are engaged and supported by conventional connection means in engagement of the front end (front wall 18) of the trailer with the rear end 15a of the tractor. The trailer rear end, at all times, including when the trailer is engaged to the tractor, is supported by sets of wheels 20 and 21, mounted towards the rear (rear wall 19) of the trailer. The suspension of the tractor rear wheels 13 and 14 with respect to trailer 10 rear, platform 15 is entirely conventional and non-pivotable. Tractor front wheels 12 are steerable. The connection of the trailer rear wheels 19 and 20 to the underside 22 of the trailer body is rigid but spring mounted with appropriate axles, bearings, springs and support connections 23 engaged with the wheels, one another and to the underside of the truck body 22. Members 23 are schematic designations of these complexes. The rolling assemblies of wheels 20 and 21 are connected to one another by schematically shown structurals 24. The top wall 25 of the trailer covers and seals the top of the cargo space therewithin. Paired hinged doors and/or sliding doors may be provided in one or both side panels 26, if desired (not shown) and/or in the rear wall 19, or both.

The front underside of the normal truck trailer is provided with vertically extending support means (paired legs) which ordinarily (when the tractor is not present) supports the entire trailer structure in a horizontal or level position. These devices typically also have means associated therewith whereby a tractor/trailer combination, upon reaching its destination and lowering the support legs will then elevate the front end of the trailer and enable the disconnection and moving away therefrom of the the tractor. Alternatively or also, such devices may also permit the raising of the front end of the trailer so as to permit the rear end 15a of a tractor to move underneath, then to be coupled with the trailer as the front end of the trailer is lowered.

Referring to FIG. 1, the subject improvement (to be described) in the just described apparatus is shown in down and support position for the trailer ahead of the center of gravity of the trailer. Ordinarily, this whole apparatus would be moved a little more to the left in order to move further forwardly from the center of gravity.

All of the remarks made above with respect to the tractor and trailer refer to the known prior (commercial) art.

While the entire cylinder-piston assembly of the subject improvement is seen mounted somewhat left of center (as well as center and somewhat right of center for the hydraulic system) in FIG. 1, the enlarged views of FIG. 2, is better studied to see the details of the foot or leg assembly retracted, in transportation mode. FIGS. 3 and 4 show the device extended downwardly in actual use from the front (FIG. 3) and the side (FIG. 4). Actually, FIG. 1 shows the device in the position of FIG. 2 in full lines and the vertical position of the legs in dotted lines.

Looking at the views, housing 27, fixed to the underside of the trailer, typically contains hydraulic pump 28 and hydraulic reservoir or fluid reservoir 29 with lines 30a connecting from the pump to the reservoir and lines 30b from the pump to the three hydraulic cylinders yet to be described.

A first one of these is cylinder 31 having piston rod 32 working therewith. Flanges 33 pivotally mount upper connector 34 of hydraulic cylinder 31 on shaft 35 between plates 33.

Referring to FIG. 3, hydraulic cylinders 36 and 37 have pistons or piston rods 38 and 39, respectively, such preferably having larger diameter feet 40 and 41. Collars 42 and 43 are rigidly fixed to the outer walls of cylinders 36 and 37 and carry shaft or rod 44, such rigidly fixed or welded to collar 42 and 43. Another collar 45 is pivotably or rotatably mounted on shaft 44.

Plates 46 carry a hollow centered (preferably) shaft or pipe 47 mounted rigidly therebetween the entire width and beyond of the two cylinders 36 and 37 held apart by collars 42 and 43 with shaft 44. The upper ends of cylinders 36 and 37 have rings 48 that rotatably encircle pipe or hollow structural 47. Just ahead of plates 46 (forward or to the front) there is provided a U shaped member generally designated 49 and comprising vertical beams 50 rigidly attached to the underside of the trailer or structural members thereon having rigidly attached thereto or welded thereto angle 51.

There are the usual conventional lines, connections, valves and controls to (1) lower the cylinders 36 and 37 by cylinder 30 from the full line picture of FIG. 1 and FIG. 2, then to extend the legs 38 and 39 until feet 40 and 41 are grounded. (2) There must be provided sufficient cylinder and leg lengths at 36 and 37 and 38 and 39 that the front end of the trailer can not only be leveled, but be lifted sufficiently to either prevent release of the tractor or permit insertion of the working deck 15 of a tractor with connecting means 16 thereon under bottom 22 whereby to engage the truck trailer. (3) Once the tractor is free or engaged, the device must be able to drop back to level by lessening the lengths of extension of legs 38, 39. (4) With the device in the situation of full lines in FIGS. 3 and 4 and dotted lines of FIG. 1, once the tractor or a tractor is carrying the front end of the trailer, the legs 38 and 39 must be retractable into cylinders 36 and 37 before raising of the construction by drawing piston rod 32 back into cylinder 31 whereby to reach the full line position of FIG. 1 and FIG. 2. All of these controls with respect to controlling extending and retracting of the pistons with respect to hydraulic cylinders, whether static or moveable are well known prior art.

From the drawings and descriptions, it will be seen that a device for optimally handling trailers with respect to tractors in all phases of the interaction of the two vehicles has been provided.

To control the vertical integrity of the cylinders 36 and 37 and legs 38 and 39, it may be seen that the angle 51 (FIG. 4) abuts the vertical side walls of cylinders 36 and 37 below their pivot point thereabove, thus preventing going over center forwardly as desired. The hydraulic pressure must be maintained in cylinder 31 to control vertical or pivoting from the vertical in the other direction and hydraulic pressure must be maintained in cylinders 36 and 37 to maintain legs 38 and 39 at the proper extension.

It is not unusual for the underside of a trailer of the sort described to have longitudinal and/or transverse or otherwise angled structural beams thereunder. These beams may first be cut and then rebuilt for the installation and operation of this device if required. To the extent possible, the device should be mounted so as to minimize structural conflicts.

Another useful feature of this invention is that, with the hydraulic cylinders 36 and 37 of sufficient length and legs 38 and 39 of sufficient length, the empty trailer can be raised sufficiently at the front whereby, on hosing out the interior of the trailer from the rear, the water will automatically drain from the trailer.

The subject device is intended to be used on a tractor/trailer truck assembly. Its use is to (1) lift and support the front end of the trailer and (2) allow the tractor to pull out from under (or insert itself under) the trailer so it stands on its own or is transportable. Such is done with the trailers own dollies and back wheels, as truckers indeed do now, only with much more convenience and money saving.

A typical installation of the subject invention is comprised of a 12 volt hydraulic pump, such run by connecting to the trucks already available electric plug that is normally connected to the tractor. This same line will be the electricity supply required for the pump. There are typically five 24 inch long by ½ inch diameter hoses and one 15 inch by ½ inch diameter hose, all leading to the hydraulic cylinders. The hoses carry the hydraulic fluid to the hydraulic cylinders.

The horizontal/vertical cylinders are the dollies that will raise or lower the trailer as desired and hold the trailer in place. These cylinders will support 35,000 pounds per cylinder. When they are attached to a large semi-trailer, they will swing up against the bottom of the trailer and be held in that position by the third cylinder when the tractor is engaged. In this manner, they are completely out of the way when not in use. Thus, they are not likely to drag on a bump or hill or become bent or dented. The latter often happens with the dollies being used now. Further, by being next to the bottom of the trailer, my new dollies will have protection from snow and ice, whereby to save the truck driver the problem of freeing them before he can support the trailer in order to pull the tractor from it. The hydraulic pump is turned on or off with the flick of a switch, thus saving the truck driver the job of an hour's hand cranking required with the present dollies.

Plates 46a tie each pair of plates 46 together or each member of each pair of plates 46, as well as the two sets thereof together. Plates 46a are positioned forward of members 47 and 48. It should be understood that the position of cylinders 36 and 37, as well as legs 38 and 39, when in action in dotted lines in FIG. 1 and full lines in FIG. 3 and 4, is preferably substantially forward, ahead of the center of gravity of trailer 17. The hydraulic cylinders 36 and 37 may be, as a specific example not intended to be limiting, 30 inches long with their length 60 inches long at full extension of the piston rods 32, 38 and 39. With conventional hydraulic equipment, it should be understood that, once the extension of legs or pistons 38 and 39 to ground with full weight load thereon is effected and once piston 32 is fully extended to maintain the cylinders 36 and 37 in position, the hydraulic system is locked and, barring rupture of a line or fitting will hold the isolated trailer in elevated front position indefinitely.

From the foregoing, it will be seen that this invention is well adapted to teach all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A support system for the front end of a semi-trailer comprising a first pair of hydraulic cylinders pivotably mounted at the tops thereof adjacent the front portion of the semi-trailer to the under side of said trailer, said hydraulic cylinders being spaced equidistant from the front end of the semi-trailer and laterally spaced apart from one another on the underside of the semi-trailer, each said cylinder having a piston rod extendable therefrom and retractable thereinto, a substantially horizontal rod rigidly fixed at its ends to each hydraulic cylinder inner side and connecting between said cylinders, whereby said two cylinders must pivot around their upper pivotal mountings parallel to one another at all times;

a third hydraulic cylinder pivotally attached at the upper end thereof to the underside of the semi-trailer;

A piston rod extendable from and retractable into said third hydraulic cylinder;

The free end of the latter piston rod pivotally connected to the rod horizontally connecting the two cylinder bodies together therebetween;

The third hydraulic cylinder connected at its upper end to the underside of the semi-trailer in a position rearward of the connection of of the first two hydraulic cylinders pivotally to flanges fixed to the underside of said trailer;

Hydraulic connections to all of the hydraulic cylinders whereby extension of the third cylinder piston rod pivots the first two joined hydraulic cylinder to a vertical position and retraction of said third piston piston rod pivots the first two joined hydraulic cylinders upwardly to a near parallel position with the level ground under the semi-trailer;

there being a hydraulic pump and a hydraulic fluid reservoir enabling the forced function of the said first and second and third hydraulic cylinders in piston extension and retraction.

2. A device as in claim 1 wherein there is provided a horizontal structural member fixed to the underside of the trailer adapted to abut the first two hydraulic cylinders when they have reached vertical position and prevent any motion thereof over center forwardly, said structural member being mounted on the underside of the semi-trailer in rigid fashion.

3. A device as in claim 2 wherein the abutment structural for the first two hydraulic cylinders extends outside the lateral extension of either of them.

4. A pair of rigidly linked together yet spaced apart first two hydraulic cylinders pivotally mounted at their upper ends on the underside of a semi-trailer, there being piston rods extendable from and retractable within each of said hydraulic cylinders, a third hydraulic cylinder pivotally mounted at an upper end thereof to the underside of the semi-trailer and having an extendable and retractable piston rod pivotally connected with the linking means connecting the first two hydraulic cylinders, the first two hydraulic cylinders simultaneously pivotable from a near horizontal upper position to a vertical lower position and held in said vertical lower position and also being moveable from said lower vertical position to said near horizontal upper position and held in said near horizontal upper position, means for preventing the first two hydraulic cylinders from rotating forwardly more than at a truly vertical position.

5. A process of first holding a pair of first hydraulic cylinders that are rigidly linked together and have extendable and retractable pistons in parallel arrangement in a substantially horizontal position below a semi-trailer, said two hydraulic cylinders pivotable from said near horizontal position to a vertical position and vice versa, by extension and retraction of the piston of a third hydraulic cylinder mounted at right angles to a plane through the said first two cylinders, then pivoting the two first hydraulic cylinders forwardly and downwardly to a vertical position, thereafter extending the lower ends of the piston rods of said first two cylinders into contact with the ground or a like supporting surface and holding said two cylinders in vertical position by said third cylinder piston extension.

6. A device as in claim 5 including the steps of retracting the piston rods of the first cylinders, then retracting the piston rod of the third hydraulic cylinder and raising the first two cylinders, with their pistons retracted, to said substantially horizontal position.

* * * * *